Oct. 7, 1958
W. F. MacGLASHAN, JR., ET AL
2,854,998
AIR TANK CHARGING VALVE
Filed April 11, 1956
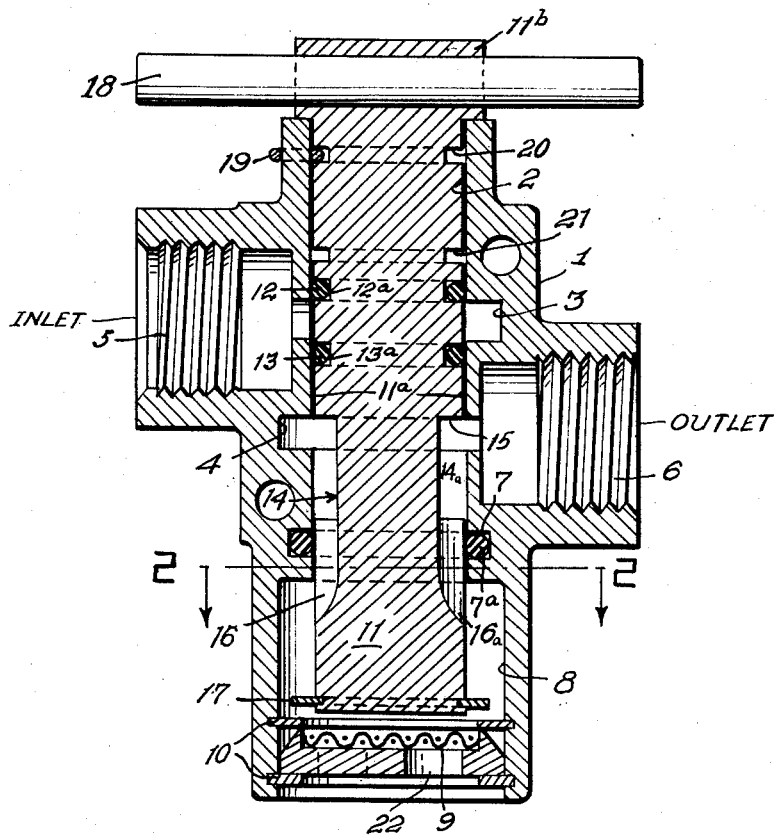
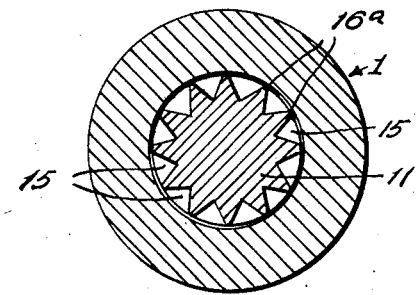
INVENTORS,
William F. MacGlashan, Jr.
BY Harry J. Margraf
Clyde R. Seitz
W. E. Thibodeau & A. W. Dew
ATTORNEYS.

United States Patent Office 2,854,998
Patented Oct. 7, 1958

2,854,998
AIR TANK CHARGING VALVE

William F. MacGlashan, Jr., Pasadena, Harry J. Margraf, Altadena, and Clyde R. Seitz, Pasadena, Calif., assignors to the United States of America as represented by the Secretary of the Army Application April 11, 1956, Serial No. 577,618

1 Claim. (Cl. 137—550)

This invention relates to an air-tank charging valve and more particularly to a manually operated open or closed line valve that vents downstream when closed.

The present invention has for its principal object a manually operated valve designed to vent downstream when closed.

It is another object of the invention to provide a valve which may be arranged to occupy a normally open or a normally closed position by manual adjustment.

It is a still further object of this invention to provide a valve employing an O-ring in the downstream vent and means to prevent "blowing-out" of the O-ring.

The specific nature of the invention as well as other objects and advantages thereof, will clearly appear from a description of a preferred embodiment as shown in the accompanying drawing in which:

Fig. 1 is a longitudinal section view taken through a valve constructed in accordance with the invention illustrating the valve in its closed position, and Fig. 2 is a cross sectional view taken along line 2—2 of Fig. 1 and looking in the direction of the arrows.

Referring more particularly to the drawing, wherein like reference characters designate like or corresponding parts throughout the different views, reference character 1 denotes a valve body, having a longitudinal bore 2, of uniform diameter. Bore 2 is intersected by annular axially spaced inlets and outlet channels 3 and 4 respectively. These channels connected to threaded inlet and outlet ports, 5 and 6, respectively. Downstream or below the outlet port 6, bore 2 is provided with an annular groove 7 receiving an O-ring 7a. Below O-ring 7a, bore 2 is enlarged diametrically by a counterbore 8. At the extremity of counterbore 8, there is provided a filter assembly 9 held in place by snap rings 10 and having a vent port 22 therein.

Slidably and rotatably mounted in bore 2 is a generally cylindrical core 11 provided with O-rings 12 and 13 received in annular channels 12a and 13a in the core disposed at opposite sides of inlet channel 3 when the valve is in its closed position as illustrated in Fig. 1.

The lower portion of core 11 as the parts are viewed in Fig. 1, is reduced as at 14 to form a channel 14a and a shoulder 15 which, when the valve is closed, as shown, is substantially flush with the upper edge of outlet channel 4. Beginning at a plane just above and parallel with groove 7, this reduced portion is provided with ribs or flutes 16a (see Fig. 2), having a maximum diametral dimension about equal to the diameter of the main body of the core, whereby O-ring 7a is maintained in its seat or channel while at the same time permitting unrestricted flow of fluid from channel 4 through channel 14a and through the passages defined by the flutes 16a.

The lower end of valve body 1 is counterbored at 8 to form a chamber into which the lower end of the core projects.

At the lower extremity of core 11 which extends into counterbore 8, there is provided a snap ring 17 to limit the upward motion of the core to fully open position.

The upper end of core 11 which protrudes from the valve body 1 is enlarged diametrically to form a head portion 11b limiting travel of the core beyond its closed position. This head portion 11a is provided with a crossbar 18 providing a handle for manual manipulation of the core 11 to open or closed position. Means for locking core 11 in a closed position is provided by a locking pin 19 fitting in an annular groove 20 in the core.

A second annular groove 21 is provided in core 11 for locking the core in open position in which the vent is closed and the inlet and outlet ports are in communication through channel 14a and flutes 16a.

To move valve core 11 to open position, the pin 19 is removed and by grasping handle 18, the core is withdrawn until movement is limited by snap ring 17 abutting the shoulder formed by counterbore 8. In this position, channel 14 bridges inlet channel 3 and outlet channel 4. In such position O-rings 12 and 13 seal in the region between the inlet channel 3 and handle 18, whereas O-ring 7 seals between the outlet channel 4 and the counterbore 8. It should be noted that during the opening of the valve the seat O-ring 13 passes from housing bore 2 on the downstream side of inlet channel 3, through channel 3 into the housing bore 2 above the channel 3 before full flow commences. The only flow that can occur while the seat O-ring 13 is passing through the channel 3 is a small amount of leakage between the housing bore 2 and the poppet portion 11a. Thus the seat O-ring 13 is safely nested out of the flow path of the fluids when full flow commences and cannot be dislodged by the dynamic effect of the fluid flow.

It is apparent from the foregoing that a highly efficient and reliable valve has been provided. Due to the arrangement of parts and the ribs 16a of the core 11, the O-ring 7a is also protected from blow-out by pressures at high flow when the valve is closed and venting downstream, hence preventing frequent replacement of the O-ring and resulting in longer life, thereof.

While a preferred form of the invention has been shown and described, various modifications and substitutions of equivalents will occur to those skilled in the art after a study of the foregoing disclosure. Hence, the disclosure should be taken in an illustrative rather than a limiting sense, and it is our desire and intention to reserve all modifications within the scope of the subjoined claim.

What is claimed is:

In an air-tank charging valve, a valve body having a longitudinal bore and a co-axial counterbore formed therein, said longitudinal bore being intersected by annular spaced inlet and outlet channels communicating with inlet and outlet ports respectively, formed in said body, a core slidably fitting said longitudinal bore and extending into said counter-bore, said core being provided with a reduced portion forming an annular channel adapted to communicate at least between said outlet channel and said counterbore when said core is in its closed position and between said inlet channel and said outlet channel when said core is in its open position, there being a series of axially directed flutes provided along the lower area of said cut out portion, an O-ring seal received in said valve body and cooperating with said core adapted to form a seal between said channel and said counterbore when said core is in its open position, a snap ring provided on said core extremity extending into said counter bore for limiting opening movement of said core, sealing means provided upon said core and disposed to seal between said valve body and said core on either side of said inlet channel when said core is in closed position and to seal the region between said inlet channel and the end of said valve body opposite said inlet channel when said core is in open position, said core provided with an enlarged head portion at its portion extending from said longitudinal bore and cooperating with said body to limit closing movement of said core, a handle in said head portion for manually operating said core in said valve body, said valve body having an aperture opening into said bore, a pair of spaced circumferential grooves in said core adjacent said head and registrable with said aperture in the open and closed positions of said core as determined by said snap ring and enlarged head portion to receive a member to lock the core in either of said positions and a filter element trapped between a pair of snap rings at the outer extremity of said counterbore to prevent entrance of foreign matter in said valve.

References Cited in the file of this patent

UNITED STATES PATENTS

| | | |
|---|---|---|
| 633,228 | Cholodkowsky | Sept. 19, 1899 |
| 2,247,590 | Strong | July 1, 1941 |
| 2,485,504 | Morgan | Oct. 18, 1949 |
| 2,517,061 | Von Stackelberg | Aug. 1, 1950 |
| 2,713,989 | Bryant | July 26, 1955 |
| 2,723,681 | MacGlashan | Nov. 15, 1955 |
| 2,747,611 | Hewitt | May 29, 1956 |